(12) United States Patent
Fukawatase et al.

(10) Patent No.: US 8,480,128 B2
(45) Date of Patent: Jul. 9, 2013

(54) VEHICLE SIDE AIRBAG APPARATUS

(75) Inventors: Osamu Fukawatase, Miyoshi (JP); Yusuke Fujiwara, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/364,988

(22) Filed: Feb. 2, 2012

(65) Prior Publication Data
US 2012/0200072 A1    Aug. 9, 2012

(30) Foreign Application Priority Data

Feb. 4, 2011    (JP) .................................. 2011-022905

(51) Int. Cl.
*B60R 21/231*    (2011.01)

(52) U.S. Cl.
USPC ................... 280/743.1; 280/730.2; 280/743.2

(58) Field of Classification Search
USPC ................................ 280/730.2, 743.1, 743.2
See application file for complete search history.

(56) References Cited

U.S. PATENT DOCUMENTS

| | | | |
|---|---|---|---|
| 5,566,977 A * | 10/1996 | Wipasuramonton | 280/743.1 |
| 6,270,113 B1 * | 8/2001 | Wipasuramonton et al. | 280/730.2 |
| 6,478,329 B1 | 11/2002 | Yokoyama | |
| 6,561,539 B1 * | 5/2003 | Sunabashiri et al. | 280/730.1 |
| 7,207,594 B2 * | 4/2007 | Igawa et al. | 280/730.1 |
| 7,770,921 B2 * | 8/2010 | Mueller et al. | 280/739 |
| 7,909,360 B2 * | 3/2011 | Marriott et al. | 280/730.2 |
| 2005/0006883 A1 * | 1/2005 | Sato et al. | 280/730.2 |

FOREIGN PATENT DOCUMENTS

| | | |
|---|---|---|
| JP | 2000289559 A | 10/2000 |
| JP | 2007-008448 A | 1/2007 |
| JP | 2007050848 A | 3/2007 |
| JP | 2006-018925 A | 1/2008 |
| JP | 2008-201172 A | 9/2008 |
| JP | 2008-201175 A | 9/2008 |

* cited by examiner

*Primary Examiner* — Paul N Dickson
*Assistant Examiner* — Timothy Wilhelm
(74) *Attorney, Agent, or Firm* — Gifford, Krass, Sprinkle, Anderson & Citkowski, P.C.

(57) ABSTRACT

A vehicle side airbag apparatus has an inflator that discharges gas when a lateral collision occurs, a side airbag that is formed by sewing a passenger-side base fabric to a vehicle body-side base fabric, that is folded when it is stored and is inflated when gas is supplied from the inflator to be deployed into a space between a passenger seated in a vehicular seat and a vehicle body side portion, and a tether that couples a middle region of the passenger-side base fabric in a longitudinal direction of a vehicle with either a rear region of the passenger-side base fabric or the vehicle body-side base fabric in the longitudinal direction of the vehicle, and partitions the side airbag into a main chamber, which comes into contact with a lateral portion of the passenger, and a rear chamber, which comes into contact with a rear portion of the passenger, during deployment.

9 Claims, 6 Drawing Sheets

VEHICLE SIDE AIRBAG APPARATUS

INCORPORATION BY REFERENCE

The disclosure of Japanese Patent Application No. 2011-022905 filed on Feb. 4, 2011 including the specification, drawings and abstract is incorporated herein by reference in its entirety.

BACKGROUND OF THE INVENTION

1. Field of the Invention

The invention relates to a vehicle side airbag apparatus.

2. Description of Related Art

In the light of a characteristic indicating that a rear portion of the passenger is hardier than a front portion of the passenger, a side airbag apparatus that protects a passenger is described in Japanese Patent Application Publication No. 2008-201175 (JP-A-2008-201175). The side airbag apparatus is composed of an inner bag that covers, in the longitudinal direction of a vehicle, a range from the back of the passenger to the middle of the passenger's chest in a standard body shape, and an outer bag that covers a range from the back of the passenger to the front of the passenger's abdomen.

Furthermore, in the light of the similar characteristic described above, side airbags having a high-pressure bag that is located beside a rear portion (back) of a passenger after the completion of deployment of the airbag, and a low-pressure bag that is located beside both a front portion (chest) and the rear portion (back) of the passenger after the completion of deployment of the airbag (see Japanese Patent Application Publication No. 2008-201172 (JP-A-2008-201172)).

However, in each of the conventional examples, the side airbag apparatus has a complicated structure, and the complicated structure needs to be customized to appropriately fit different vehicle models.

SUMMARY OF THE INVENTION

It is an object of the invention to provide a vehicle side airbag that may be easily adapted to fit in various vehicle models with only slight adjustments in dimensions, thereby substantially reducing costs. The side vehicle airbag according to the invention has a simple structure, and is capable of restraining a rear portion of a passenger in the event of a lateral collision.

A vehicle side airbag apparatus according to a first aspect of the invention has an inflator that discharges a gas when a lateral collision of the vehicle occurs, a side airbag that is formed by sewing a passenger-side base fabric to a vehicle body-side base fabric, that is folded when it is stored and is inflated when gas is supplied from the inflator to be deployed into a space between a passenger seated in a vehicular seat and a vehicle body side portion, and a tether that couples a middle region of the passenger-side base fabric in a longitudinal direction of a vehicle to one of a rear region of the passenger-side base fabric and the vehicle body-side base fabric in the longitudinal direction of the vehicle, and partitions the side airbag into a main chamber and a rear chamber, which comes into contact with a rear portion of the passenger when the side airbag is inflated and deployed.

In the aforementioned vehicular side airbag apparatus, when a lateral collision occurs the side airbag having the main chamber and the rear chamber is supplied with the gas from the inflator, deployed into the space between the passenger seated in the vehicle seat and the vehicle body side portion, and restrains a lateral portion of the passenger. At this moment, in addition to the contact of the main chamber with the lateral portion of the passenger, the rear chamber comes into contact with the rear portion (back) of the passenger. Therefore, the area of contact between the side airbag and the passenger increases. Thus, the pressure applied to the passenger at a contact portion between the side airbag and the passenger can be alleviated.

The rear chamber is partitioned by coupling the middle region of the passenger-side base fabric in the longitudinal direction of the vehicle and one of the rear region of the passenger-side base fabric and the vehicle body-side base fabric in the longitudinal direction of the vehicle to each other by the tether, and is therefore simple in structure. Thus, the adaptation to an appropriate dimension for different vehicle models can be made through a slight dimensional change, and a substantial reduction in cost can be achieved.

In the vehicle side airbag apparatus according to the first aspect of the invention, the passenger-side base fabric may be longer than the vehicle body-side base fabric in the longitudinal direction of the vehicle, and the rear chamber may be configured with a surplus length of the passenger-side base fabric with respect to the vehicle body-side base fabric.

In the aforementioned configuration, the rear chamber is configured with the surplus length of the passenger-side base fabric with respect to the vehicle body-side base fabric. Therefore, when the side airbag is inflated and deployed, the rear chamber protrudes toward the rear portion of the passenger. Thus, the rear portion of the passenger can be restrained at an early stage by the rear chamber.

In the aforementioned vehicle side airbag apparatus, the inflator may be provided in the rear chamber, and at least one communication hole, through which the gas from the rear chamber is supplied to the main chamber, formed in the tether.

In this configuration, the inflator is provided in the rear chamber. Therefore, when a lateral collision occurs, the gas from the inflator is first supplied into the rear chamber, and then is supplied from the rear chamber into the main chamber through the communication hole of the tether. Accordingly, the rear chamber starts to be inflated and deployed before the main chamber. Therefore, the rear portion of the passenger can be restrained at an early stage by the rear chamber, and an improvement in restraint performance can be made.

Furthermore, the main chamber may correspond to a chest of the passenger when the side airbag is inflated and deployed, and a plurality of communication holes identical to the communication hole may be formed through the tether and are spaced in the vertical direction.

In this configuration, when a lateral collision occurs, due to the gas supplied from the inflator, the rear chamber corresponding to the rear portion (back) of the passenger is inflated and deployed before the main chamber, and the gas in the rear chamber is supplied into the main chamber corresponding to the chest of the passenger through the plurality of the communication holes formed through the tether, so that the main chamber expands and deploys. The tether having the plurality of the communication holes has the function of distributing the gas. Therefore, the side airbag can be made extremely simple in structure.

In the vehicle side airbag apparatus according to the foregoing aspect of the invention, the main chamber may further comprise an upper chamber corresponding to a chest of the passenger, and a lower chamber corresponding to a waist of the passenger. The main chamber may include a partition wall that partitions the upper chamber from the lower chamber, and that suppresses a bag thickness of a boundary portion between the upper chamber and the lower chamber when the side airbag is deployed. A gas discharge port of the inflator may be provided with a diffuser that distributes the gas to the rear chamber and the lower chamber.

In this configuration, when a lateral collision occurs, the gas is first distributed to the lower chamber of the main chamber and the rear chamber by the diffuser. The gas supplied into the rear chamber is supplied into the upper chamber of the main chamber through the communication hole of the tether. Then, the rear portion (back) of the passenger can be restrained by the rear chamber, the waist of the passenger can be restrained by the lower chamber, and besides, the chest of the passenger can be restrained by the upper chamber. Further, at this moment, the bag thickness of the boundary portion between the upper chamber and the lower chamber is suppressed by the partition wall. Therefore, the passenger can be more stably restrained than in a case where the upper chamber is partitioned from the lower chamber by a seam.

In the vehicle side airbag apparatus according to the foregoing aspect of the invention, a rear end of the tether may be sewn together with the passenger-side base fabric and the vehicle body-side base fabric.

In the aforementioned configuration, the tether can be easily sewn to the passenger-side base fabric and the vehicle body-side base fabric, and the side airbag having the rear chamber can be easily manufactured.

As described above, the vehicle side airbag apparatus according to the aspect of the invention can achieve an excellent effect. That is, in the side airbag apparatus capable of restraining the rear portion of the passenger when a lateral collision occurs, with a simple structure, the adaptation to an appropriate dimension for different vehicle models can be made through a slight dimensional change, and a substantial reduction in cost can be achieved.

BRIEF DESCRIPTION OF THE DRAWINGS

Features, advantages, and technical and industrial significance of example embodiments of the invention will be described below with reference to the accompanying drawings, in which like numerals denote like elements, and wherein.

DETAILED DESCRIPTION OF EMBODIMENTS

Modes for carrying out the invention will be described below with reference to the drawings. It should be noted that arrows "FR", "IN", and "UP" in the drawings respectively indicate the forward direction, the inward direction, and the upward direction with respect to the vehicle.

Figure 1:
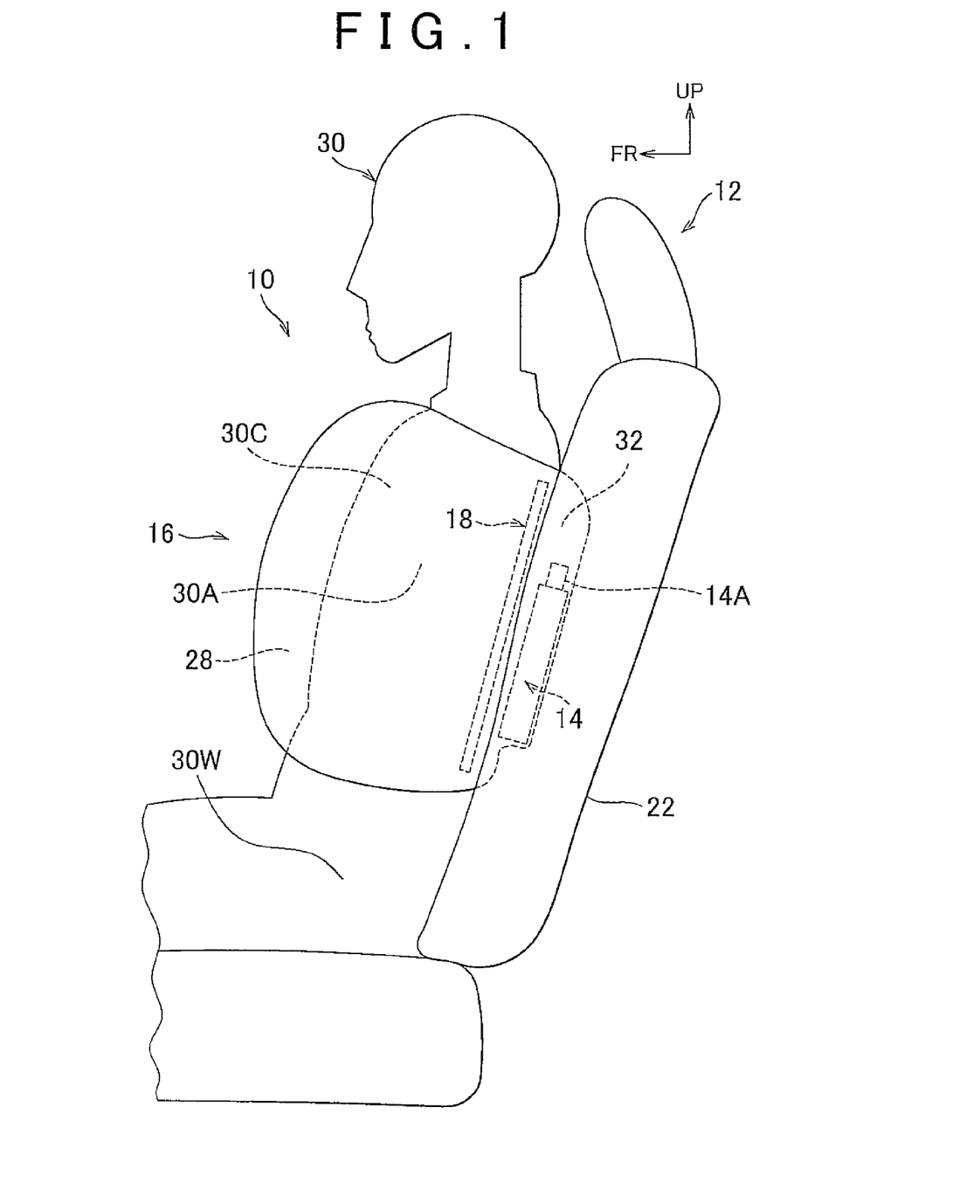
FIG. 1 is a lateral view showing a side airbag according to the first embodiment of the invention when the side airbag has been inflated and deployed beside a seated passenger.

In FIG. 1, a vehicle side airbag apparatus 10 according to the first embodiment of the invention may be mounted on, for example, a vehicular seat 12, and includes an inflator 14, a side airbag 16, and a tether 18.

Figure 2:
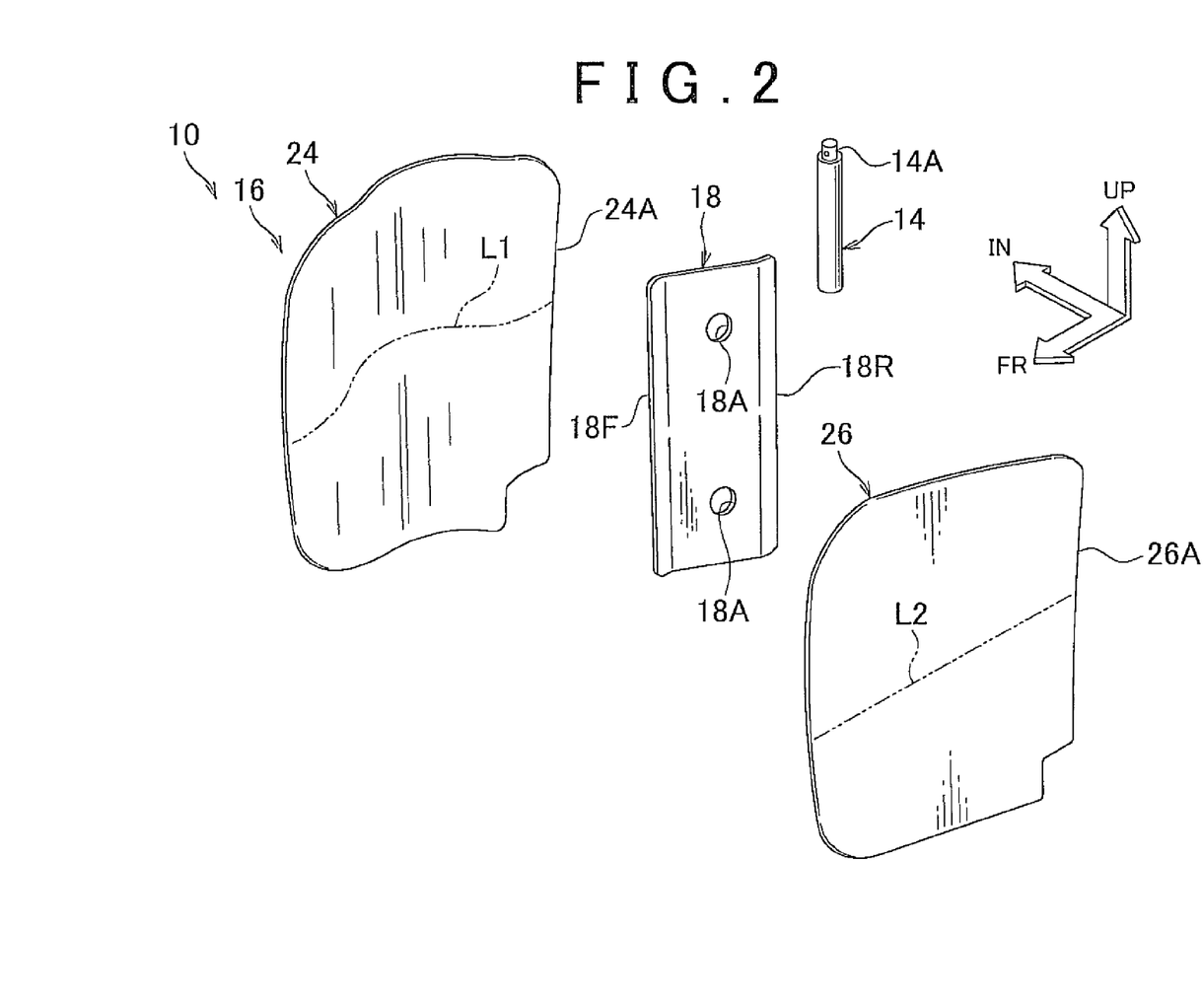
FIG. 2 is an exploded perspective view of the vehicle side airbag apparatus according to the first embodiment of the invention.

In FIGS. 1 and 2, the inflator 14 is a tubular gas generation source that discharges a gas when a lateral collision occurs. The inflator 14 is provided in a rear chamber 32, which will be described later, with a gas discharge port 14A directed upward. Alternatively, the inflator 14 may be arranged with the gas discharge port 14A being directed downward.

The inflator 14 is connected to an airbag ECU (not shown). The airbag ECU directs a working current to flow to the inflator 14 when the occurrence of a lateral collision is detected from a signal from a lateral collision sensor (not shown) or predicted. "The event of a lateral collision" can include the prediction of a lateral collision as well as the actual occurrence of a lateral collision. The event of the prediction of a lateral collision refers to, for example, the detection of an inevitable occurrence of a lateral collision by a lateral collision pre-crash sensor.

Figure 3:
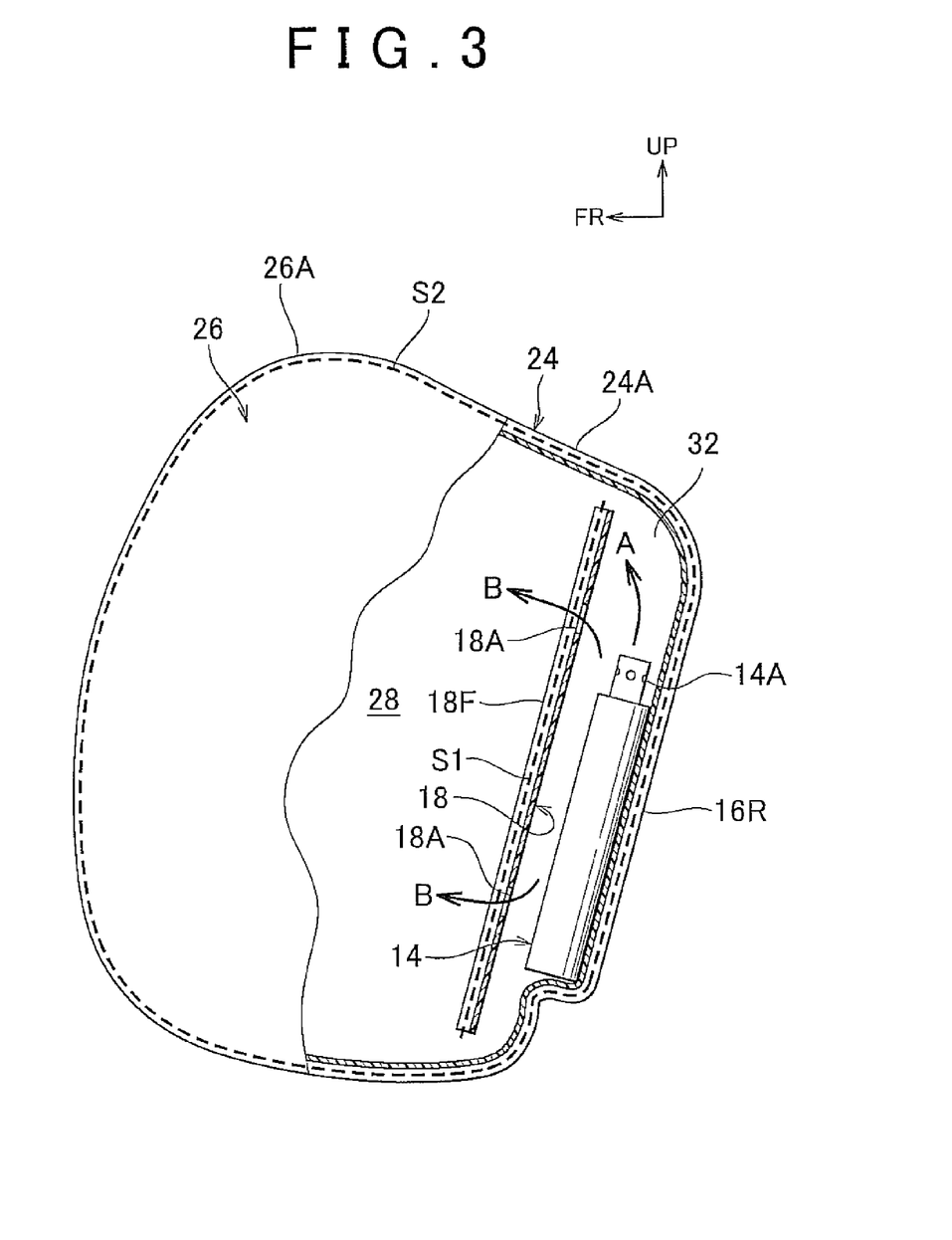
FIG. 3 is a lateral partial cutaway view of the a rear chamber and the main chamber of a vehicle side airbag according to the first embodiment of the invention when being inflated with gas supplied from an inflator.
Figure 4:
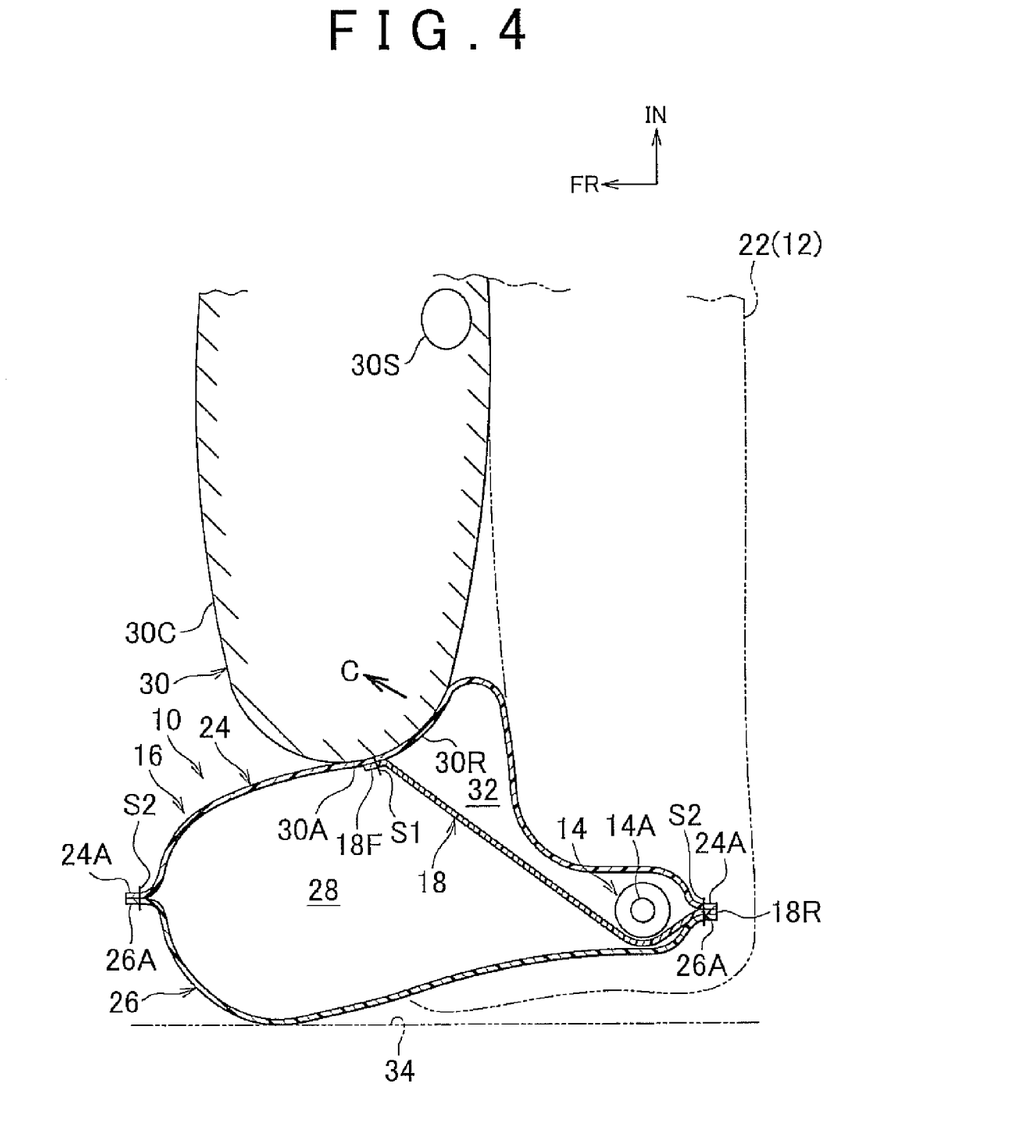
FIG. 4 is an enlarged cross-sectional view of the rear chamber when restraining a rear portion of the passenger and the main chamber when restraining a lateral portion of the passenger, in the side airbag according to the first embodiment of the invention.

In FIGS. 2 and 3, the side airbag 16 is formed by superposing at least a passenger-side base fabric 24 and a vehicle body-side base fabric 26 on each other and sewing the respective peripheral edges 24A and 26A together at seam S2. Both the passenger-side base fabric 24 and the vehicle body-side base fabric 26 are not elastic cloths. The side airbag 16 normally includes the inflator 14, and is folded in a lateral portion of a seatback 22 of the vehicular seat 12, which is located outside in a vehicle width direction, when stored. Besides, as shown in FIGS. 1 and 4, the side airbag 16 is inflated with gas supplied from the inflator 14 and deployed into the space between a passenger 30 seated in the vehicular seat 12 and a vehicle body side portion 34.

The passenger-side base fabric 24 is longer than the vehicle body-side base fabric 26 in the longitudinal direction of the vehicle. The rear chamber 32 is configured with a surplus length of the passenger-side base fabric 24 with respect to the vehicle body-side base fabric 26. It should be noted herein that "the length" mentioned above is equivalent to the length of a cut end face in a horizontal cross-section of a central portion of each of the base fabrics in a vertical direction of the vehicle the length of each of alternate long and two short dashes lines L1 and L2 in FIG. 2).

It should be noted that the passenger-side base fabric 24 and the vehicle body-side base fabric 26 may also be a single base fabric that is folded in two forward with respect to the vehicle at a position of a rear end edge 16R (FIG. 3) of the side airbag 16, so as to use that region of the base fabric which is located on the passenger side as the passenger-side base fabric 24 and that region of the base fabric which is located on the vehicle body side as the vehicle body-side base fabric 26.

In FIGS. 1 to 4, the tether 18 couples an middle region of the passenger-side base fabric 24 in the longitudinal direction of the vehicle to a rear region of the passenger-side base fabric 24, and partitions the side airbag 16 into a main chamber 28 that comes into contact with a lateral portion 30A of the passenger 30 when deployed, and the rear chamber 32, which comes into contact with a rear portion 30R of the passenger 30 when deployed. The main chamber 28 corresponds to the lateral portion 30A of the passenger's chest 30C, and the rear chamber 32 corresponds to the rear portion (back) 30R of the passenger 30. The rear portion 30R of the passenger 30 refers to a back-side region of the passenger 30 where a spinal cord 30S is located, when viewed from a position beside the passenger 30. The middle region of the passenger-side base fabric 24 signifies a region of the passenger-side base fabric 24, which is to be a middle region in the longitudinal direction of the vehicle when the side airbag 16 is mounted on the vehicle, more specifically, when the side airbag 16 is inflated. The rear region of the passenger-side base fabric 24 signifies a region of the passenger-side base fabric 24, which is to be a rear region in the longitudinal direction of the vehicle when the side airbag 16 is mounted on the vehicle, more specifically, when the side airbag 16 is inflated.

More specifically, the tether 18 extends vertically in the side airbag 16, and the front end 18F of the tether 18 is sewn to the middle region of the passenger-side base fabric 24 in the longitudinal direction of the vehicle at a seam S1. Further, as shown in FIG. 4, the rear end 18R of the tether 18 is sandwiched between the peripheral edges 24A and 26A and sewn together with the passenger-side base fabric 24 and the vehicle body-side base fabric 26 at the seam S2. The length of the tether 18 in a plan view (i.e., horizontal cross-sectional view when the side airbag 16 is inflated and deployed) is shorter than the surplus length of the passenger-side base fabric 24. When the side airbag 16 is inflated and deployed, the rear chamber 32 is more likely to protrude toward the rear portion 30R of the passenger 30 than the main chamber 28.

As shown in FIG. 2, a plurality of communication holes 18A, through which gas is supplied from the rear chamber 32 to the main chamber 28, are formed through the tether 18 and are spaced in the vertical direction. In the example shown in the drawing, two circular communication holes 18A are formed. It should be noted that the positions, number, shape, and opening area of the communication holes 18A are appropriately set in consideration of, for example, the timing for expanding each of the chambers, the internal pressure in restraining the passenger, and the like.

Figure 5:
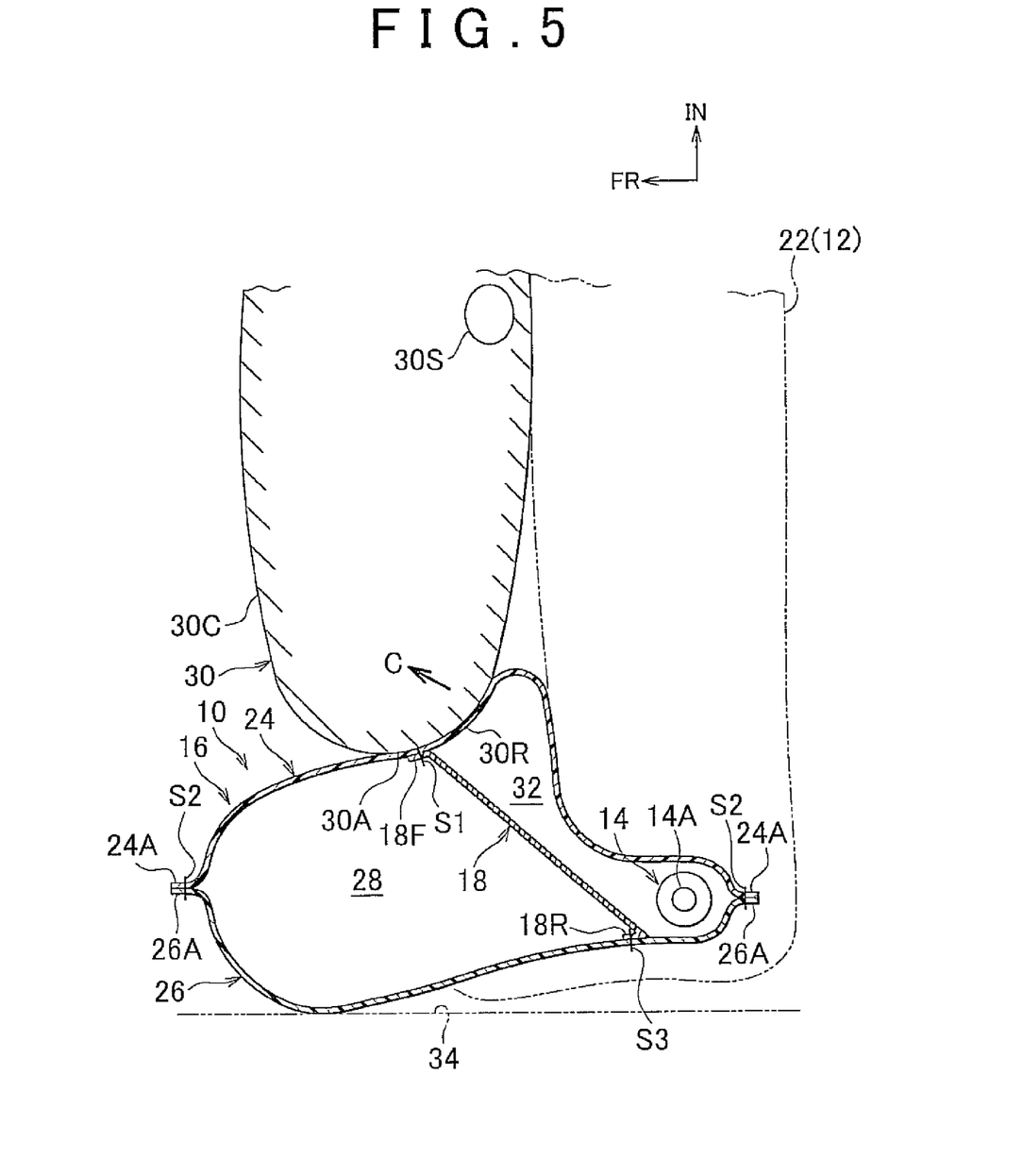
FIG. 5 is an enlarged cross sectional view of the rear chamber when restraining the rear portion of the passenger and the main chamber when restraining the lateral portion of the passenger, in the side airbag according to a modified example of the first embodiment of the invention.

As shown in FIG. 5, the rear end 18R of the tether 18 may be coupled to the rear region of the vehicle body-side base fabric 26 at a seam S3. Alternatively, the rear end 18R may be coupled to the area of the rear region of the passenger-side base fabric 24 that is exclusive of the peripheral edge 24A so that the rear chamber 32 is defined by the passenger-side base fabric 24 and the tether 18 (not shown).

The first embodiment of the invention is configured as described above, and the operation thereof will next be described. In FIG. 1, in the vehicle side airbag apparatus 10 according to the first embodiment of the invention, because the rear end 18R of the tether 18 is sewn together with the passenger-side base fabric 24 and the vehicle body-side base fabric 26, the sewing of the tether 18 to the passenger-side base fabric 24 and the vehicle body-side base fabric 26 can be facilitated. Further, the side airbag 16 having the rear chamber 32 can thus be manufactured with ease.

Further, the rear chamber 32 is partitioned by coupling the middle region of the passenger-side base fabric 24 in the longitudinal direction of the vehicle with either the rear region of the passenger-side base fabric 24 or the vehicle body-side base fabric 26 in the longitudinal direction of the vehicle by the tether 18, and is therefore simple in structure. Thus, the adaptation to an appropriate dimension for different vehicle models can be made through a slight dimensional change, and a substantial reduction in cost can be achieved.

Next, the operation in the event of a lateral collision will be described. When the airbag ECU determines that a lateral collision has occurred based on signals from the lateral collision sensor, an ignition current is caused to flow from the airbag ECU to the inflator 14. The inflator 14 is then ignited by this ignition current, so that gas is discharged from the gas discharge port 14A.

As shown in FIG. 3, this inflator 14 is provided in the rear chamber 32. Therefore, the gas discharged from the gas discharge port 14A of the inflator 14 is first supplied into the rear chamber 32 in the direction of an arrow A. Thus, the rear chamber 32 is inflated and deployed before the main chamber 28. In contrast, the gas is supplied from the rear chamber 32 into the main chamber 28 in the direction of an arrow B through the plurality of communication holes 18A. Thus, the main chamber 28 is inflated and deployed. The tether 18 having the plurality of communication holes 18A serves to distribute the gas. Therefore, there is no need to provide an additional distribution member, thereby simplifying the structure of the side airbag 16.

As shown in FIGS. 4 and 5, as the side airbag 16 starts to be inflated and deployed, it bulges out in the vehicle forward direction from the lateral portion of the seatback 22, and deploys into a space between the passenger 30 seated in the vehicular seat 12 and the vehicle body side portion 34. Then, the rear chamber 32 that is first inflated and deployed comes into contact with the rear portion 30R of the passenger 30, so that the rear portion 30R can be restrained at an early stage. Further, the main chamber 28 comes into contact with the lateral portion 30A (the chest portion C) of the passenger 30, so that the lateral portion 30A can be restrained.

Furthermore, the rear chamber 32 is configured with the surplus length of the passenger-side base fabric 24. Therefore, the rear chamber 32 protrudes toward the rear portion 30R of the passenger 30 when the side airbag 16 is inflated and deployed. Accordingly, the rear portion 30R of the passenger 30, can be restrained at a much earlier stage by the rear chamber 32. In other words, the bag thickness of the rear chamber 32 corresponding to the rear portion 30R of the passenger 30 is larger in bag thickness is greater in the vehicle width direction than that of the main chamber 28 corresponding to the lateral portion 30A of the passenger 30. Therefore, an impact on the spinal cord 30S of the passenger 30 is effectively alleviated.

Further, as shown in FIGS. 4 and 5, the rear chamber 32 is inflated and deployed into the space between the rear portion 30R of the passenger 30 and the seatback 22, so that the passenger 30 may also be pushed inward in the vehicle width direction and forward in the vehicle longitudinal direction, that is, in the direction of an arrow C, and distanced from the vehicle body side portion 34.

Thus, this embodiment of the invention ensures that the rear chamber 32 comes into contact with the rear portion 30R of the passenger 30 and that the main chamber 28 comes into contact with the lateral portion 30A of the passenger 30. Therefore, the area of contact between the side airbag 16 and the passenger 30 increases. Thus, improving restraint performance can be made while alleviating the pressure applied to the passenger 30 at a contact portion between the side airbag 16 and the passenger 30.

Figure 6:
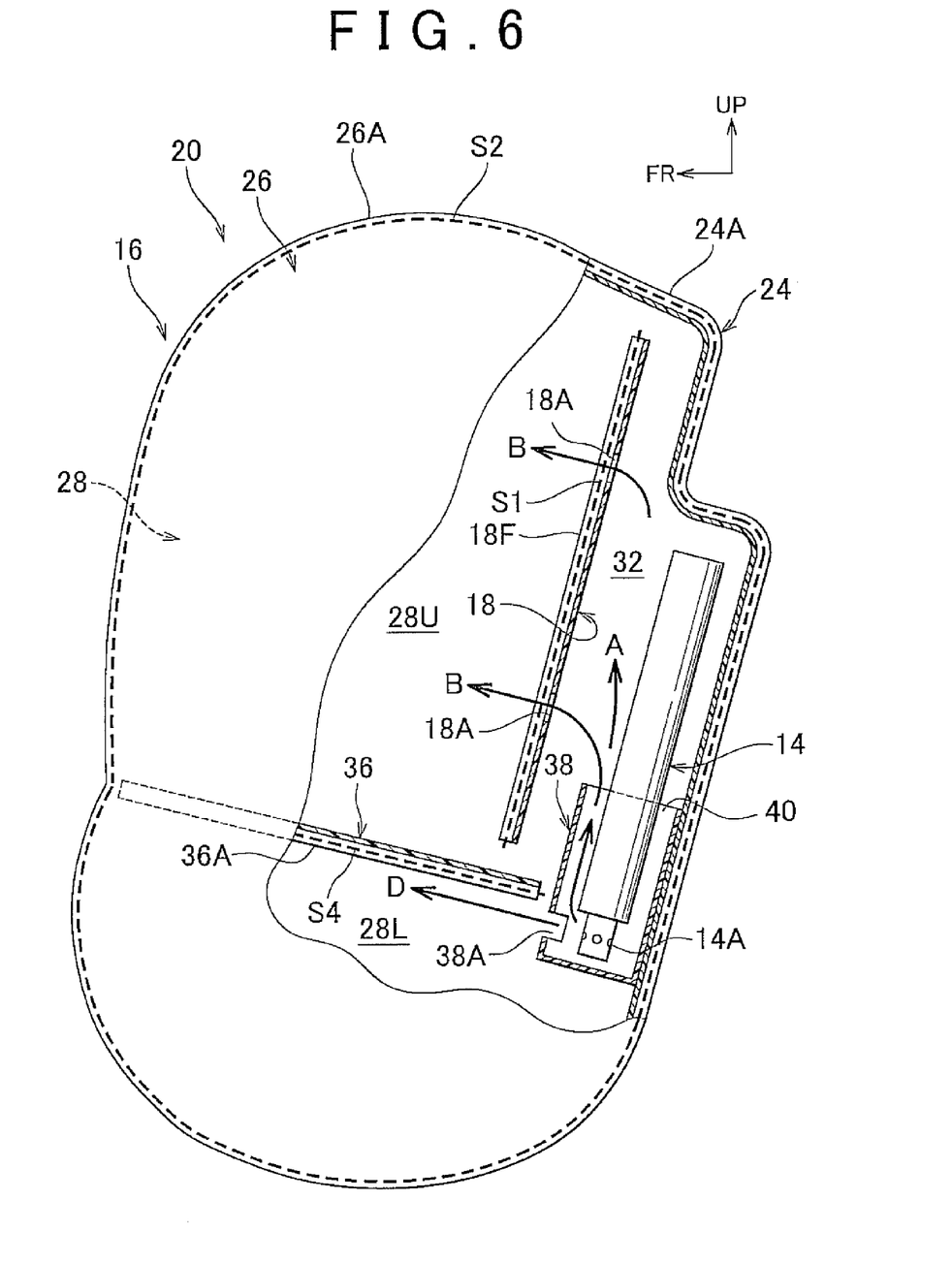
FIG. 6 is a lateral partial cutaway view of a vehicle side airbag apparatus according to the second embodiment of the invention and of the rear chamber and the main chamber of a vehicle side airbag according to the second embodiment of the invention when being inflated with gas supplied from an inflator.

In FIG. 6, in a vehicle side airbag apparatus 20 according to the second embodiment of the invention, the main chamber 28 has an upper chamber 28U corresponding to the chest portion 30C (see FIG. 1) of the passenger 30, and a lower chamber 28L corresponding to a waist portion 30W (see FIG.

1) of the passenger 30. The tether 18 partitions the rear chamber 32 and the upper chamber 28U from each other.

The main chamber 28 is provided with a partition wall 36 that partitions the upper chamber 28U and the lower chamber 28L from each other and suppresses the bag thickness of a boundary portion between the upper chamber 28U and the lower chamber 28L during expansion. The partition wall 36 uses a non-elastic base fabric similar to the passenger-side base fabric 24 and the vehicle body-side base fabric 26. Further, the partition wall 36 extends in, for example, a range from a front end of the side airbag 16 to a front side of the inflator 14 located in the rear chamber 32. The width of the partition wall 36 is set in consideration of the bag thickness of the side airbag 16 when the side airbag 16 is inflated and deployment. Both ends 36A of the partition wall 36 in the vehicle width direction are sewn to the passenger-side base fabric 24 and the vehicle body-side base fabric 26 respectively, at a seam S4. It should be noted that the partition wall 36 may also be formed from a portion of the passenger-side base fabric 24 or the vehicle body-side base fabric 26.

In the second embodiment of the invention, the gas discharge port 14A of the inflator 14 is directed downward, and is provided below the partition wall 36. In other words, the gas discharge port 14A is inserted in the lower chamber 28L. In addition, the gas discharge port 14A includes a diffuser 38 that distributes the gas discharged through the gas discharge port 14A to the rear chamber 32 and the lower chamber 28L. The diffuser 38 is shaped as a bottomed cylinder, and is laid on the gas discharge port 14A of the inflator 14. The inner diameter of the diffuser 38 is larger than the outer diameter of the inflator 14. Thus, a gap 40 leading to the rear chamber 32 is formed between the inflator 14 and the diffuser 38. Further, an opening 38A that opens toward the lower chamber 28L is formed through the diffuser 38 forward of the gas discharge port 14A in the vehicle length direction. It should be noted that the configuration of the diffuser 38 is not restricted to that described above.

Otherwise, the second embodiment of the invention is substantially identical to the first embodiment of the invention. Therefore, like elements are denoted by like reference symbols in the drawings, and the description of such elements is omitted.

The second embodiment of the invention is configured as described above, and the operation thereof will now be described. In FIG. 6, in the vehicle side airbag apparatus 20 according to the second embodiment of the invention, the flow of the gas discharged through the gas discharge port 14A of the inflator 14 when a lateral collision occurs is regulated by the diffuser 38, and the gas is distributed to the lower chamber 28L of the main chamber 28 and the rear chamber 32. More specifically, the gas is supplied through the opening portion 38A of the diffuser 38 into the lower chamber 28L in the direction of an arrow D, and is supplied into the rear chamber 32 in the direction of the arrow A through the gap 40 between the inflator 14 and the diffuser 38. Thus, the lower chamber 28L and the rear chamber 32 is inflated and deploy first. Further, the internal pressure of the lower chamber 28L is higher than that of the upper chamber 28U.

The gas supplied to the rear chamber 32 is then supplied to the upper chamber 28U of the main chamber 28 through the communication holes 18A of the tether 18. Thus, the upper chamber 28U is inflated and deployed. As a result, the rear portion 30R of the passenger 30 may be restrained by the rear chamber 32, the waist portion 30W of the passenger 30 may be restrained by the lower chamber 28L, which has higher pressure than the upper chamber 28U, and also, the lateral portion 30A of the chest portion 30C of the passenger 30 may be restrained by the upper chamber 28U, which has lower pressure than the lower chamber 28L (see FIG. 1).

Further, at this moment, the bag thickness of the boundary portion between the upper chamber 28U and the lower chamber 28L is suppressed by the partition wall 36. Therefore, the passenger 30 is restrained more stably than when the upper chamber 28U is partitioned from the lower chamber 28L by a seam.

In each of the first and second embodiments of the invention, the inflator 14 is provided in the rear chamber 32, but the invention is not restricted to this configuration. For example, the inflator 14 may be provided outside the side airbag 16, and the gas discharge port 14A may be connected to the rear chamber 32 via a pipe (e.g., a diffuser pipe).

The passenger-side base fabric 24 is longer than the vehicle body-side base fabric 26 in the longitudinal direction of the vehicle, but the invention is not restricted to this configuration. The length of the passenger-side base fabric 24 need only be sufficient to allow the formation of the rear chamber 32 that contacts the rear portion 30R of the passenger 30 when the side airbag 16 is inflated and deployed.

A plurality of communication holes 18A are formed through the tether 18 so as to be spaced in the vertical direction, but the invention is not restricted to this configuration. Alternatively, a single communication hole 18A may be provided instead. Further, gas may be supplied from the rear chamber 32 to the main chamber 28 through a gap between the passenger-side base fabric 24 or the vehicle body-side base fabric 26 and the tether 18, instead of forming communication holes in the tether 18. Particularly, a length of the tether 18 in the vertical direction may be set shorter than a length of the side airbag 16 when the side airbag 16 is inflated and deployed. The gas may be supplied from the rear chamber 32 to the main chamber 28 through the gap between the passenger-side base fabric 24 or the vehicle body-side base fabric 26 and un upper edge of the tether 18, and the gap between the passenger-side base fabric 24 or the vehicle body-side base fabric 26 and a lower edge of the tether 18. Alternatively, a plurality of tethers may be provided with being separate from each other in the vertical direction to ensure that the gas is supplied through all the tethers.

What is claimed is:

1. A vehicle side airbag apparatus comprising:
    an inflator that discharges a gas when a lateral collision of the vehicle occurs;
    a side airbag that is formed by sewing a passenger-side base fabric to a vehicle body-side base fabric, the side airbag is folded when it is stored and is inflated when gas is supplied from the inflator to be deployed into a space between a passenger seated in a vehicular seat and a vehicle body side portion; and
    a tether having a front end and a rear end in a longitudinal direction of a vehicle, the front end of the tether is coupled to a middle region of the passenger-side base fabric in the longitudinal direction of the vehicle, and the rear end of the tether is coupled to a rear region of the vehicle body-side base fabric in the longitudinal direction of the vehicle, and the tether partitions the side airbag into a main chamber and a rear chamber, which comes into contact with a rear portion of the passenger when the side airbag is inflated and deployed
    wherein the passenger-side base fabric is longer than the vehicle body-side base fabric in the longitudinal direction of the vehicle so as to provide the rear chamber with a surplus length of the passenger-side base fabric with respect to the vehicle body-side base fabric.

2. The vehicle side airbag apparatus according to claim 1, wherein
the tether extends in a vertical direction of the vehicle, and
the tether is shorter than the surplus length of the passenger-side base fabric in a cross-sectional view in a horizontal direction.

3. The vehicle side airbag apparatus according to claim 1, wherein
the inflator is provided in the rear chamber, and
at least one communication hole, through which the gas from the rear chamber is supplied to the main chamber, is formed in the tether.

4. The vehicle side airbag apparatus according to claim 3, wherein
the main chamber corresponds to a chest of the passenger when the side airbag is inflated and deployment, and
a plurality of communication holes identical to the communication hole are formed through the tether and are spaced in the vertical direction.

5. The vehicle side airbag apparatus according to claim 3, wherein
the main chamber further comprises an upper chamber corresponding to a chest of the passenger, and a lower chamber corresponding to a waist of the passenger,
the main chamber includes a partition wall that partitions the upper chamber from the lower chamber, and that suppresses a bag thickness of a boundary portion between the upper chamber and the lower chamber when the side airbag is deployed, and
a gas discharge port of the inflator is provided with a diffuser that distributes the gas to the rear chamber and the lower chamber.

6. The vehicle side airbag apparatus according to claim 5, wherein the tether partitions the rear chamber from the upper chamber.

7. The vehicle side airbag apparatus according to claim 5, wherein the partition wall is configured from a non-elastic fabric.

8. The vehicle side airbag apparatus according to claim 1, wherein
the inflator is provided outside the rear chamber, and
a gas discharge port of the inflator is connected to the rear chamber by a pipe.

9. The vehicle side airbag apparatus according to claim 1, wherein
a length of the tether in the vertical direction is set shorter than a length of the side airbag when the side airbag is inflated and deployed, and
the gas is supplied from the rear chamber to the main chamber through a gap between the passenger-side base fabric or the vehicle body-side base fabric and an upper edge of the tether, and a gap between the passenger-side base fabric or the vehicle body-side base fabric and a lower edge of the tether.

* * * * *